US005938804A

United States Patent [19]
Engel et al.

[11] Patent Number: 5,938,804
[45] Date of Patent: *Aug. 17, 1999

[54] REVERSE FLOW AIR FILTER ARRANGEMENT AND METHOD

[75] Inventors: Donald Francis Engel, Prior Lake, Minn.; Dolan Bartels, Cresco, Iowa; John Hacker, Bloomington, Minn.; Bruce Crenshaw, Indianapolis, Ind.; Don Harold, deceased, late of Prior Lake; by Shirley A. Harold, legal representative, Scott County, both of Minn.

[73] Assignee: Donaldson Company, Inc., Minneapolis, Minn.

[*] Notice: This patent is subject to a terminal disclaimer.

[21] Appl. No.: 08/884,205

[22] Filed: Jun. 27, 1997

Related U.S. Application Data

[60] Continuation-in-part of application No. 08/742,244, Oct. 31, 1996, Pat. No. 5,690,712, which is a division of application No. 08/344,371, Nov. 23, 1994, Pat. No. 5,613,992.

[51] Int. Cl.$^6$ .................................................. B01D 27/06
[52] U.S. Cl. ............................... 55/428; 55/466; 55/498; 55/502; 55/510; 96/189
[58] Field of Search ............................. 55/423, 428, 466, 55/476, 498, 502, 510; 95/273; 96/189

[56] References Cited

U.S. PATENT DOCUMENTS

| | | |
|---|---|---|
| 2,973,832 | 3/1961 | Cook et al. . |
| 3,190,058 | 6/1965 | Farr et al. . |
| 3,226,917 | 1/1966 | Donovan et al. . |
| 3,429,108 | 2/1969 | Larson . |
| 3,535,853 | 10/1970 | Brown et al. . |
| 3,811,251 | 5/1974 | Gibel . |

(List continued on next page.)

FOREIGN PATENT DOCUMENTS

| | | |
|---|---|---|
| 0 650 750 A2 | 5/1995 | European Pat. Off. . |
| 1 385 428 | 12/1965 | France . |
| 1000074 | 2/1983 | U.S.S.R. .................................. 55/498 |
| WO 96/15841 | 5/1996 | WIPO . |

OTHER PUBLICATIONS

Donaldson product brochure 1200–159, "EBA, Air Cleaner", pp. 1–2 (copyright 1986, revised Apr. 1986).
Donaldson product brochure 1200–272, "EBA, ECG Konepac™ Air Cleaners", pp. 1–2 (copyright 1986, revised Apr. 1986).
Donaldson brochure "Donaldson' Stainless Steel Air Cleaner, A Bright Idea for Big Rigs" pp. 1–4 (copyright 1988, revised May 1988).
Donaldson prdouct 1200–403, "Bright Stainless Konepac Air Cleaner" pp. 1–2 (copyright 1987), revised Feb. 1987).
Farr Engine Products Bulletin B–1500 46A, "Ecolite™ Disposable Air Cleaners", pp. 1–4 (Copyright 1977, no month shown on the publication).
Farr Engine Products Bulletin No. B–1500–67, "ECO–CM for Kenworth with Under–hood/Outside Air Inlet" pp. 1–2 (Jul. 1987).
Farr Engine Products bulletin No. B–1500–66, "ECO–BC Air Cleaner" pp. 1–2 (no date on publication).
Farr brochure "By Farr, the Best Filters for the Long Haul", one page (no date on publication).

*Primary Examiner*—C. Scott Bushey
*Attorney, Agent, or Firm*—Merchant, Gould, Smith, Edell, Welter & Schmidt, P.A.

[57] ABSTRACT

A reverse flow air filter arrangement is provided. The arrangement includes a filter element having first and second end caps, the second end cap having a central drainage aperture. A funnel shape on an interior surface of second end cap is used to direct moisture flow to the drainage aperture. The arrangement includes a housing in which the filter element is positioned, operatively, during use. Certain features in the housing facilitate moisture withdrawal from the filter element while also inhibiting interference with sealing between the filter element and the housing.

14 Claims, 13 Drawing Sheets

U.S. PATENT DOCUMENTS

| | | |
|---|---|---|
| 4,203,739 | 5/1980 | Erdmannsdorfer . |
| 4,516,994 | 5/1985 | Kocher . |
| 4,632,682 | 12/1986 | Erdmannsdorfer . |
| 4,720,292 | 1/1988 | Engel et al. . |
| 4,735,640 | 4/1988 | Thornburgh et al. . |
| 4,759,783 | 7/1988 | Machado . |
| 4,764,191 | 8/1988 | Morelli . |
| 4,848,989 | 7/1989 | Maeda . |
| 5,006,235 | 4/1991 | Cooper . |
| 5,238,474 | 8/1993 | Kahlbaugh et al. . |
| 5,547,480 | 8/1996 | Coulonvaux . |
| 5,613,992 | 3/1997 | Engel . |
| 5,690,712 | 11/1997 | Engel ........................................ 55/428 |
| B1 4,720,292 | 9/1991 | Engel et al. . |
| B2 4,720,292 | 2/1994 | Engel at al. . |

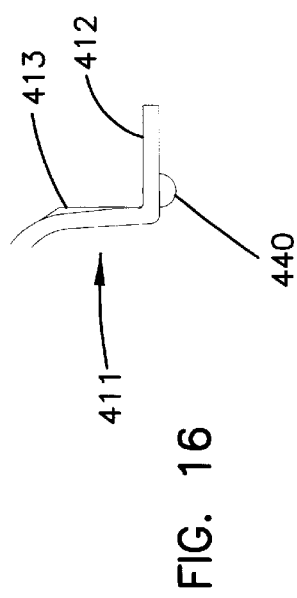
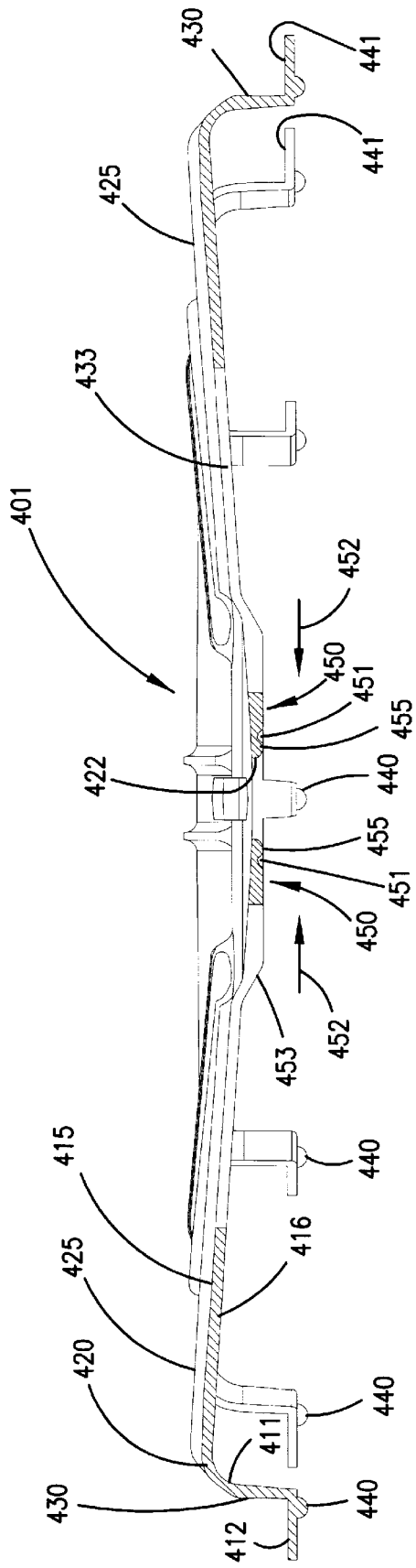

5,938,804

REVERSE FLOW AIR FILTER ARRANGEMENT AND METHOD

CROSS-REFERENCE TO RELATED APPLICATIONS

The present application is a continuation-in-part application of U.S. Ser. No. 08/742,244, filed Oct. 31, 1996, now U.S. Pat. No. 5,690,712. U.S. Ser. No. 08/742,244 was a divisional of U.S. Ser. No. 08/344,371, filed Nov. 23, 1994, now U.S. Pat. No. 5,613,992. The complete disclosure of application U.S. Ser. No. 08/742,244 is incorporated herein by reference. Application Ser. No. 08/344,371 issued on Mar. 25, 1997 as U.S. Pat. No. 5,613,992. The complete disclosures of U.S. Pat. No. 5,613,992 and the application which issued as the '992 patent are also incorporated herein by reference.

FIELD OF THE INVENTION

The present invention relates to reverse flow air cleaner arrangements. That is, the invention concerns air cleaner arrangements wherein filtering flow is in a direction with the "clean" side of the air filter being around an exterior thereof, and the "dirty" side of the air filter being along an interior thereof. The invention particularly concerns such air cleaner arrangements having drainage systems for water accumulating in an interior of associated air filter elements. The invention also concerns provision of preferred components, such as air filter elements, for use with such arrangements; and, to methods involving the use of such arrangements.

BACKGROUND OF THE INVENTION

In general, air cleaner arrangements include a housing and an air filter element. The housing is configured such that air is directed through the air filter element, for filtering. Various geometric configurations of the air cleaner housing, the air filter element, and related seal arrangements are used to effect this.

Many air cleaner arrangements include generally cylindrical air filter elements. Such elements typically include filter media arranged in a cylindrical pattern, with end caps. Seal arrangements are used either on or in conjunction with the end caps, to provide appropriate sealing with the housing or other portions of the air cleaner, and to control the direction of air flow.

Reverse air flow air cleaner arrangements are generally those in which air is directed to an interior of the air filter element before it is filtered, and the air is filtered as it passes through the air filter element from the interior to the exterior. If the air filter element is cylindrical, this means that the unfiltered air is directed into the interior of the cylinder, and then through the filter media, to an exterior, during filtering. Material entrained in the air directed into the air filter, then, is left along an interior of the cylindrical filter media.

Consider, for example, a reverse flow air cleaner arrangement, having a cylindrical air filter element, utilized on an over the highway truck. Air directed into the interior of the cylindrical element may include dust, leaves, large particulates, and even moisture entrained therein. This material will tend to build up in the interior of the air filter element, in time. If the water depth inside the air filter becomes significant, the water, alone or with fine particulates or salt in suspension, can permeate the filter media. This has the potential to damage engine components. It would be preferred that arrangements be provided to drain the water from the interior of the filter element.

In those arrangements wherein the filter element is operationally oriented such that the longitudinal axis of the cylindrical air filter is substantially vertical, drainage arrangements involving drainage apertures in one of the end caps have been used. In general, these have involved offset (from a central location) apertures in one end cap, and unless the air filter element is oriented nearly perfectly vertically, drainage is inefficient. Also, in such arrangements debris can sometimes collect along interior surfaces of the housing when the arrangement is opened and the element is removed; and, unless the housing is thoroughly cleaned before the element is reinserted into the housing, the debris can interfere with attainment of a good seal at critical locations.

Summary of the Disclosure of U.S. Ser. No. 08/742,244

According to the disclosure of U.S. Ser. No. 08/742,244, an air filter arrangement is provided. The air filter arrangement includes a housing and an air filter element having first and second opposite end caps, filter media and an open filter interior. The first end cap has an air inlet opening therein, for air to be passed into the arrangement to be filtered. The second end cap has a central drainage aperture and an interior surface constructed and arranged to funnel moisture that collects on the second end cap interior surface to the central drainage aperture, and outwardly from the filter element. The central drainage aperture is preferably positioned at a center of the second end cap, with a longitudinal axis of the air filter element passing therethrough. The air filter arrangement also includes an air flow direction arrangement constructed and arranged to direct air flow into the housing, into the open filter interior, through the filter media for filtering and then outwardly from the housing, as filtered air. The air flow direction arrangement generally comprises various features of the housing, seals and filter element.

Preferably, the interior surface of the second end cap is circular. In certain embodiments it includes a plurality of radially directed troughs which terminate in the central drainage aperture. The troughs can be used to help funnel and direct moisture collected on an interior surface of the air filter element in use (i.e., "when operationally" or "operatively" assembled).

In certain preferred arrangements, according to the U.S. Ser. No. 08/742,244 disclosure, the second end cap includes an outer annular compressible portion and the housing includes an annular sealing surface against which the second end cap outer annular compressible portion is sealed, when the air filter arrangement is operatively assembled for use. Such a seal is referred to herein as a peripheral or annular radial seal, around the second end cap. That is, in this context the term "annular" refers to a sealing portion around the outside of the end cap, which seals under radial compression.

In a preferred embodiment, according to the U.S. Ser. No. 08/742,244 disclosure, the housing includes a base having a central, preferably recessed, pan and a sealing bead circumferentially positioned around the central recessed pan. A drainage aperture is provided in the central pan, so that water collected in the pan can be removed from the housing. With such an arrangement, preferably the second end cap is constructed and arranged to form a secondary seal with the sealing bead in the base, when the air filter element is operatively positioned within the housing. Preferably the manner of engagement with the seal bead is by provision of a mating "trough" in the second end cap outer surface.

According to the U.S. Ser. No. 08/742,244 disclosure, preferably the second end cap outer surface has an outer edge or lip; and, the second end cap outer surface is recessed (or depressed) in extension between the outer edge and the trough which engages the sealing bead and the base. In this manner, a preferred gap or space is provided between the filter element second end cap, and the housing base, in the region between the sealing bead of the base and an outer peripheral area of the base. A space in this location accommodates debris that may collect in the housing, without interference with the seal between the second end cap and the housing. This is facilitated by those arrangements involving provision of the seal along an annular portion of the end cap, as a radial seal, rather than as an end or axial seal.

According to the U.S. Ser. No. 08/742,244 disclosure, preferably the second end cap outer surface is configured to provide a funnel surface having a declination angle of at least about 1°, and preferably 1° to 3°, in the region of extension between the outer edge of the second end cap and the portion of the end cap which engages the seal bead in the base.

In preferred arrangements, according to the U.S. Ser. No. 08/742,244 disclosure, an evacuation valve is mounted in the drainage aperture of the recessed pan in the base. This provides for a preferred, controlled, drainage of moisture from the system.

In preferred embodiments, according to the U.S. Ser. No. 08/742,244 disclosure, a soft polymeric material is utilized for the first and second end caps. Preferably each of the polymeric end caps comprise polyurethane. For the end caps, a polyurethane foam material having an "as molded" density of about 14–22 lbs per ft$^3$ will be preferred (most preferably about 18.4). In some embodiments, the same material can be utilized for both end caps.

In preferred constructions, according to the U.S. Ser. No. 08/742,244 disclosure, an air inlet tube is provided in the housing, which is configured to generate a radial seal with the first end cap of the filter element.

In an alternate embodiment, described in the U.S. Ser. No. 08/742,244 disclosure, an arrangement having a sheet metal end cap as the second end cap is provided. This arrangement is preferably axially sealed, by provision of a primary seal gasket axially compressed between the second end cap and the base, when the air filter arrangement is operationally assembled. A secondary gasket can also be provided in such arrangements between a selected portion of the second end cap and the housing base.

According to the U.S. Ser. No. 08/742,244 disclosure, a preferred filter element is provided. The preferred filter element comprises a generally cylindrical extension of filter media. The filter media may be, for example, a pleated paper filter media. Preferably, an inner support liner and an outer support liner are provided, for the cylindrical extension of filter media. Preferably the arrangement has first and second end caps, the first end cap including an air inlet opening therein. The second end cap preferably has a central drainage aperture and an interior surface constructed and arranged to funnel moisture, collected on the interior surface of the second end cap, to the central drainage aperture. The central drainage aperture is preferably located at an approximate center of the end cap, on a longitudinal axis of the cylindrical extension of filter media. A preferred configuration for the interior surface of the second end cap, is as an interior of a funnel. In some embodiments, the second end cap interior surface includes a plurality of radially directed troughs therein, which terminate at the central drainage aperture.

Other preferred features for the preferred air filter element described in the U.S. Ser. No. 08/742,244 disclosure include: a circular sealing trough on an outer surface of the second end cap; and, a recess between an outer edge of the end cap outer surface and the circular trough. Also, a compressible region providing for a radial seal along an annular portion of the second end cap is preferred.

According to the U.S. Ser. No. 08/742,244 disclosure, a method of operating a reverse flow air filter arrangement is provided. In general, the method comprises collecting moisture within the filter element and draining the moisture from the filter element through a central aperture in the end cap, by funneling the moisture to the central aperture.

SUMMARY OF THE PRESENT DISCLOSURE

According to the portion of the present specification which comprises added disclosure relating to FIGS. 9–14, the end cap which includes the drainage aperture therein, is provided in a preferred composite structure. The composite results from an outer portion comprising a soft, compressible, polymeric material; and, an inner "pre-form" or insert, which becomes positioned between the polymeric material and the inner liner, during molding. The insert has preferred inner surface characteristics, to accomplish desirable flow of liquid to the drainage aperture, and outwardly from an interior of the filter element. In addition, it has preferred features to facilitate molding using a free rise technique.

The preferred "pre-form" or insert also has depending legs with outwardly projecting feet. The legs and feet operate, cooperatively, as a mold stand-off for media. An underside of each foot has a bead thereon, to facilitate this.

Further features and advantages from the preferred inserts and "pre-forms" described herein, as well as techniques for use, will be apparent from the more detailed description below.

BRIEF DESCRIPTION OF THE DRAWINGS

FIG. 4 being generally taken along line 4—4, FIG. 1.

FIG. 5 generally being taken along line 5—5, FIG. 1.

FIG. 11 is a cross-sectional view of the component depicted in FIG. 10, taken along line 11—11 thereof.

FIG. 16 is an enlarged view of one of the legs of the component depicted in FIG. 11.

DETAILED DESCRIPTION

Disclosure of U.S. Ser. No. 08/742,244 and Its Parent U.S. Ser. No. 08/344,371

Figure 1:
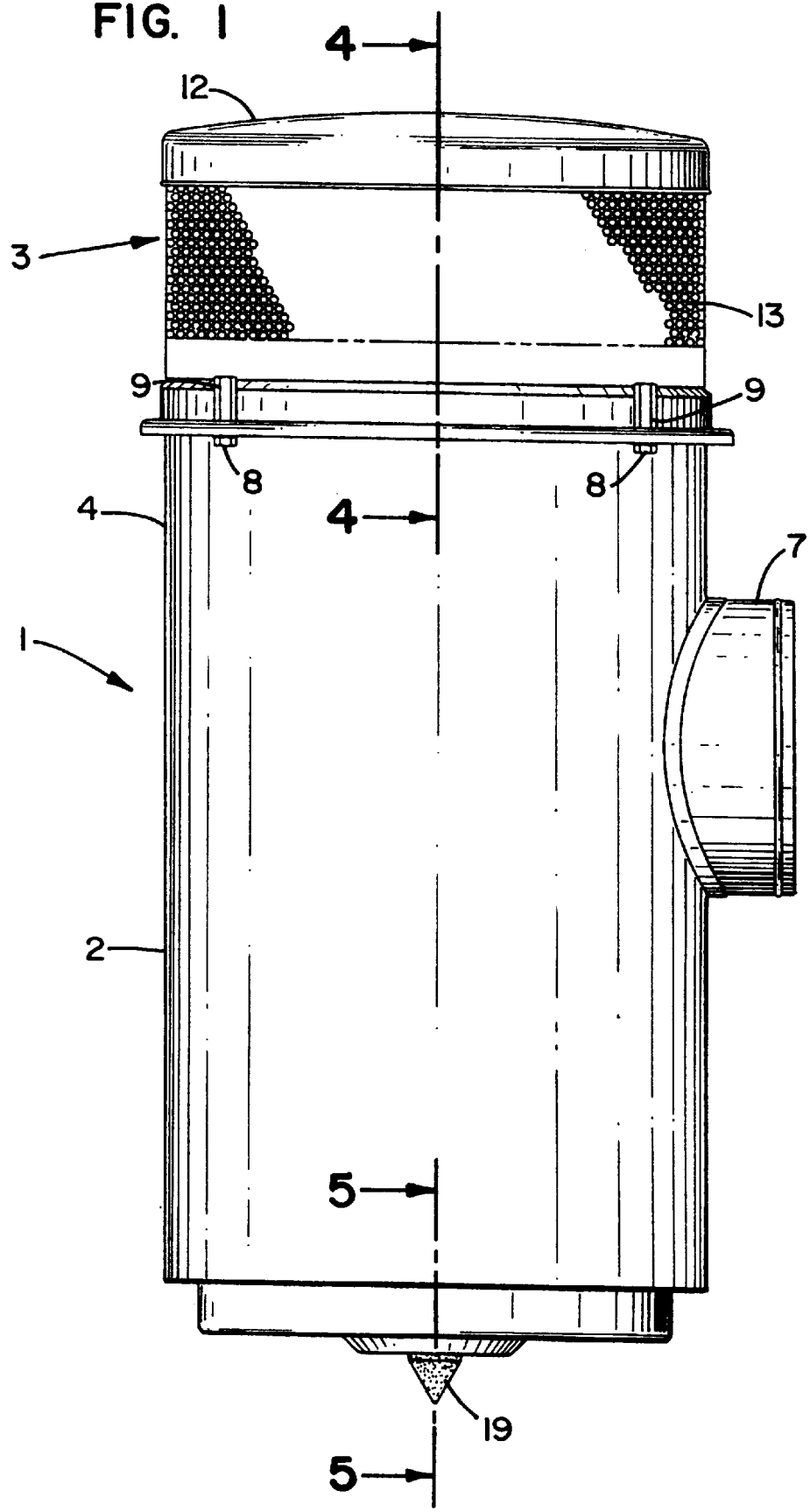
FIG. 1 is a side elevational view of an air cleaner arrangement according to the present invention.

The reference numeral 1, FIG. 1, generally designates an air cleaner assembly according to the disclosure of Ser. No. 08/742,244. FIG. 1 is a side elevational view of air cleaner assembly 1. In the Figure, housing 2 is depicted generally. The housing 2 includes an inlet construction 3 and a filter element receiver or can 4. Can 4 includes outlet 7. In use, air to be filtered passes through inlet construction 3, and is directed to an interior of can 4. Within can 4, the air is directed through a filter element, not viewable in FIG. 1. After being filtered by the filter element, the air passes outwardly through outlet 7 and is directed to the air intake of the engine, not shown. Herein, the term "air flow direction arrangement" is used to generally refer to those features of an air filter arrangement which direct air flow in the preferred manner or along a preferred path. The term may refer to a variety of features, and typically refers to internal configurations of the housing and filter element, as well as the various seals.

Still referring to FIG. 1, inlet construction 3 is mounted on can 4, and is secured thereto by bolts 8 and nuts 9. Access to the interior of can 4, and a filter element positioned therein, is obtained by loosening bolts 8 and separating inlet construction 3 from can 4.

Figure 4:
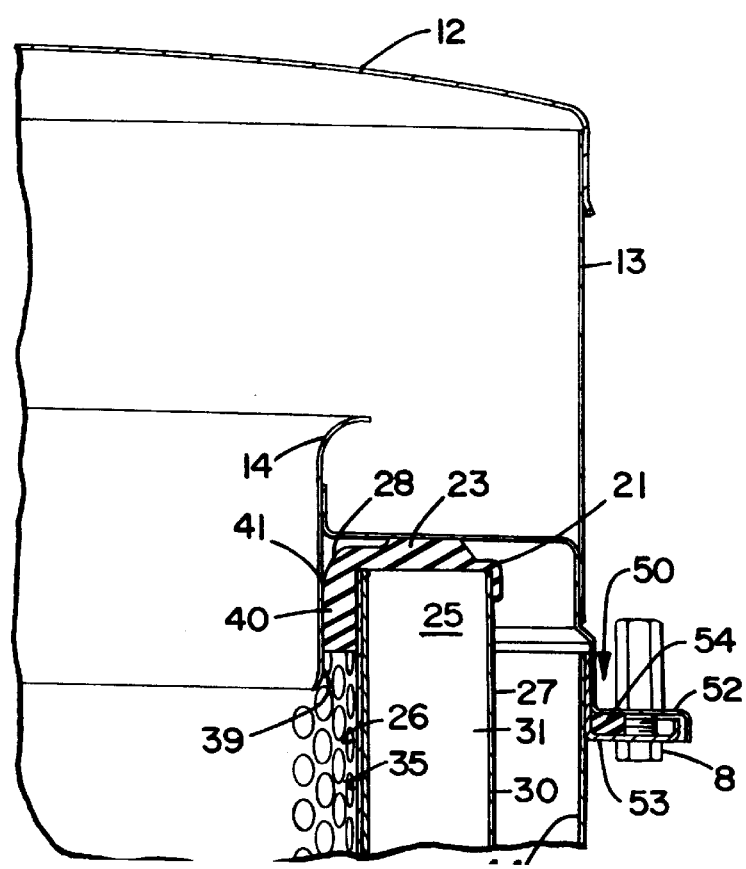
FIG. 4 is an enlarged fragmentary side cross-sectional view of a portion of the arrangement shown in FIG. 1.

For the particular construction shown, inlet construction 3 includes an upper dome 12, perforated air inlet screen 13 and an inlet tube 14 (the inlet tube not being viewable in FIG. 1, but being shown in FIG. 4 in cross-section).

Figure 5:
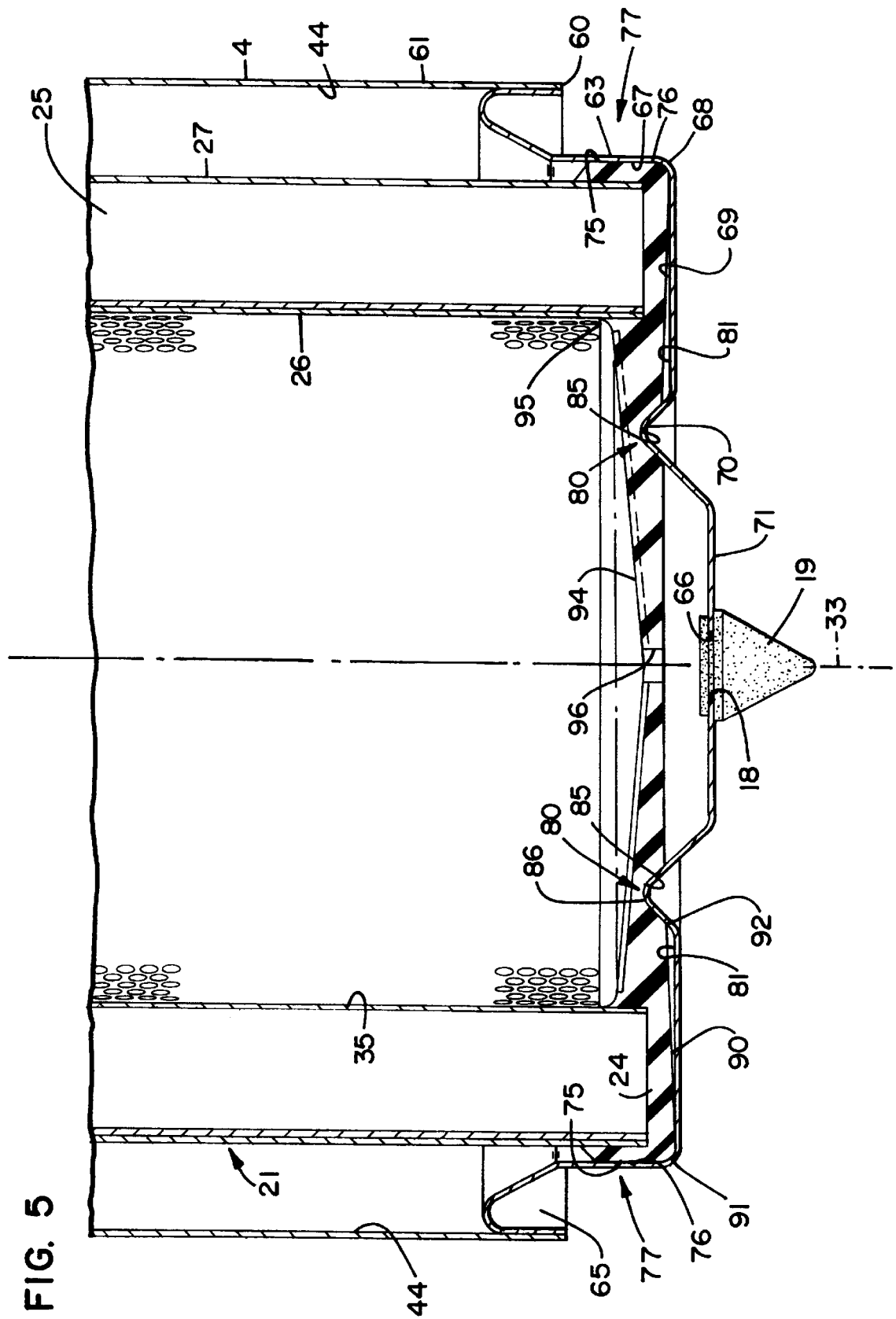
FIG. 5 is a fragmentary cross-sectional view of a portion of the arrangement shown in FIG. 1.

Still referring to FIG. 1, can 4 includes a drainage aperture therein, the drainage aperture not being viewable in FIG. 1, but being shown at reference numeral 18 in FIG. 5. The drainage aperture is covered by an evacuation valve 19. The evacuation valve 19 may be, for example, as described in U.S. Pat. No. 3,429,108, the disclosure of which is incorporated herein by reference. In general, the drainage aperture 18 is positioned in a portion of can 4 which will be, when assembly 1 is operatively installed, positioned at the bottom of the assembly 1. Thus, water will tend to collect near aperture 18, and be drained therefrom, in use. This will be more readily apparent from further descriptions wherein internal details of air cleaner assembly 1 are presented.

Figure 2:
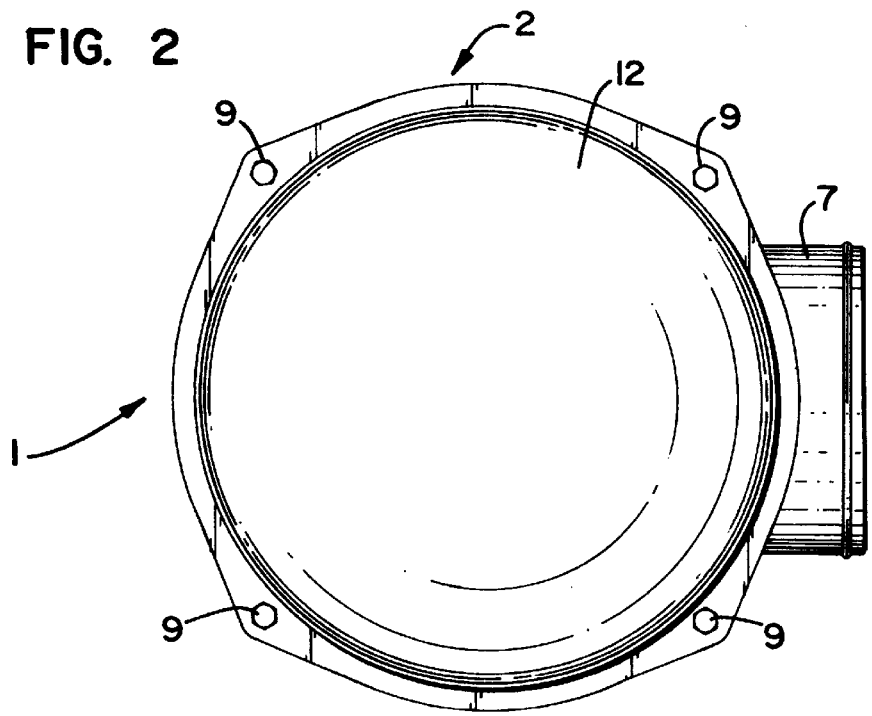
FIG. 2 is a top plan view of the arrangement shown in FIG. 1.

Referring to FIG. 2, air cleaner assembly 1 includes four bolts and nuts 9 for securing the inlet construction 3 to the filter can 4. While the number of bolts used may be varied, depending on the particular application, it is an advantage of constructions according to the 08/742,244 disclosure that filter assemblies as large as about 15 inches in outside diameter can be reliably secured closed, with as few as about three to five bolts. Features which facilitate this, will be apparent from further descriptions.

Figure 3:
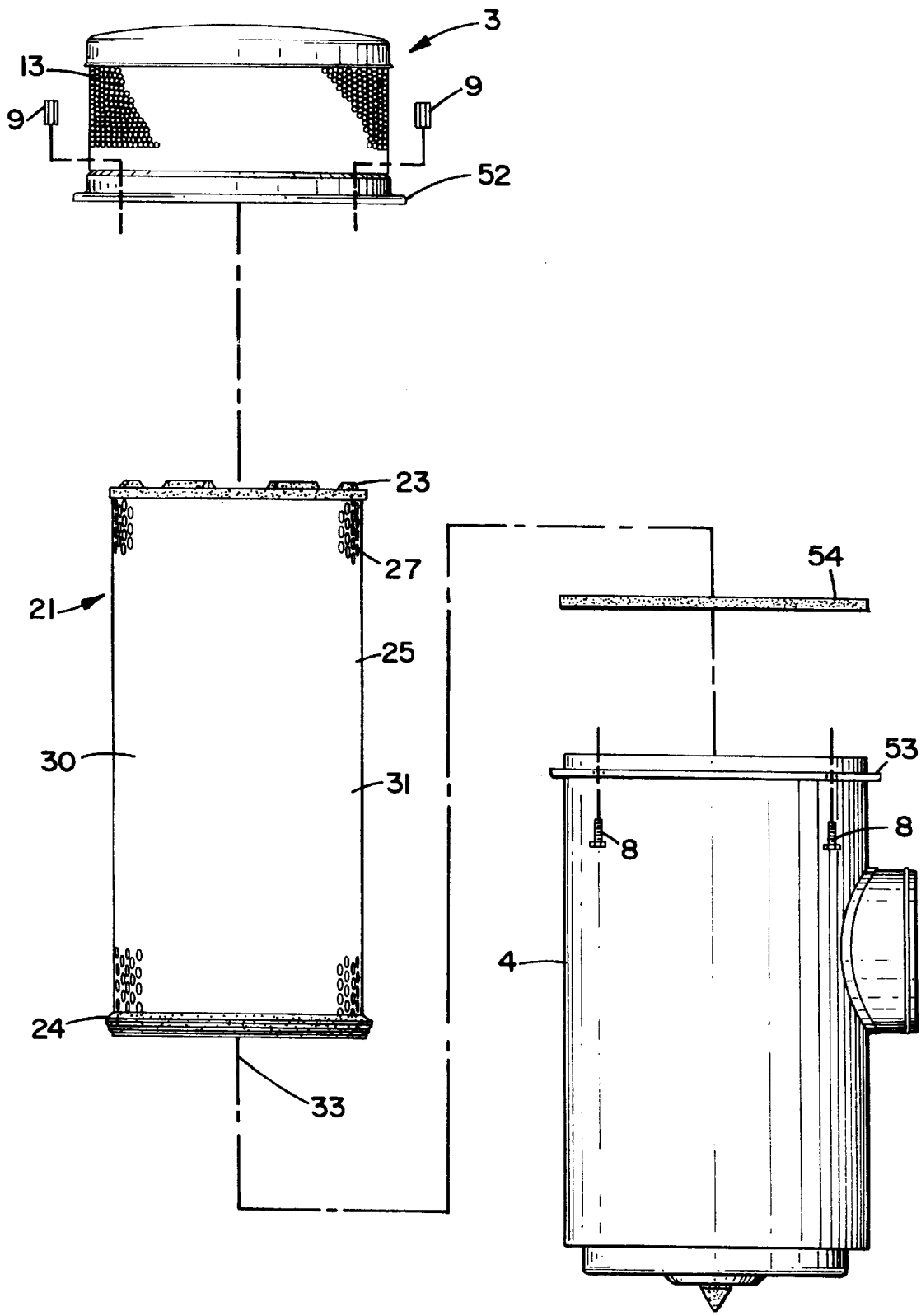
FIG. 3 is an exploded plan view of the arrangement shown in FIG. 1.

An exploded view of air cleaner assembly 1 is depicted in FIG. 3. In FIG. 3, air cleaner assembly 1 is shown with inlet construction 3 separated from filter can 4, and with air cleaner element 21 removed from can 4. For the particular arrangement shown, air cleaner element 21 is generally cylindrical. Element 21 includes first and second end caps 23 and 24; filter media 25; inner support 26 (FIG. 4); and, outer support 27. For the particular embodiment shown, filter media 25 comprises a pleated paper construction 30. In general, pleated paper construction 30 comprises a cylinder 31 of fluted paper with the flutes running in a direction longitudinally along, and generally parallel to, a central axis 33 of the element 21. It will be understood that alternate filter media constructions could be utilized. In general, the filter media 25 extends between the end caps 23 and 24. For assembly 1 depicted, end caps 23 and 24 comprise polymeric material as described below, in which opposite ends of the filter media 25 are set or potted.

In FIG. 4 a fragmentary cross-sectional view of air cleaner assembly 1 is depicted. In FIG. 4, the inlet construction 3 and portions of air cleaner assembly 1, in association therewith, are depicted.

In general, the filter media 25 is positioned between inner support 26 and outer support 27. Each support generally comprises a tubular or cylindrical extension of perforated metal or expanded metal, opposite ends of which are also set in, or potted in, end caps 23 and 24.

In general, end cap 23 is open and end cap 24 is closed. That is, end cap 23 includes a large inlet aperture 28 (FIG. 4) therein, for introduction of air to be filtered into filter element interior 35. End cap 24, on the other hand, is generally closed, but for a drainage aperture extending therethrough as described below.

Still referring to FIG. 4, it can be seen that inlet construction 3 includes inlet tube 14. When assembled, inlet tube 14 extends into aperture 28 in end cap 23. At least in this location, end cap 23 is preferably formed of a soft compressible material. When inlet tube 14 is not inserted into aperture 28, at least a portion of aperture 28 in its uncompressed state will generally have an inside diameter slightly larger than an outside diameter of section 39 of inlet tube 14; i.e., the portion of tube 14 which engages end cap 23 when arrangement 1 is operatively assembled. Thus, when inlet tube 14 is inserted through aperture 28, end cap material in region 40 will be compressed. In this manner a seal is formed at region 41. Such seals are described, for example, in conjunction with air cleaner assemblies in U.S. Pat. No. B2 4,720,292, the disclosure of which are incorporated herein by reference. It is noted that the arrangement of U.S. Pat. No. 4,720,282 is not necessarily a reverse flow arrangement; however, the principles relating to the formation of the seal are basically the same. Such seals are sometimes referred to as "radial" or "radial-type" seals, since the forces maintaining sealing are directed radially around a central longitudinal axis 33 (FIG. 3) of the tube and element, rather than co-extensively or coaxially therewith. For the particular arrangement shown in FIGS. 1–7, material at region 40 is compressed between and against both inlet tube 14 and inner support 26; that is, inner support 26 is set sufficiently deeply into end cap 23 that a portion of it is positioned behind compressible region 40, to provide support. Thus, a good seal is effected. The shape of aperture 28 in region 41 will preferably be as a ribbed or stepped funnel (or tapered), to facilitate engagement. Such a ribbed arrangement is shown in 5,238,474, incorporated herein by reference. In U.S. Pat. No. 4,720,292 a similarly tapered surface without ribs is shown. Preferably, three equally sized steps from a region of diameter about the same as the inlet tube O.D. are used, with the amount of total compression of the smallest diameter rib (i.e., region of most compression) being about 21.4% (20%

±3%). The size of each step will depend in part on the diameter of the inlet tube. In general, for an element used with an inlet tube having an O.D. of 175–200 mm, a total compression thereacross of 2.7 mm (or 1.35 mm for any location since any location compresses about one-half of the total compression) for the smallest rib would be used.

It will be understood, then, that for the arrangement shown in FIGS. 1–7, seal 41 prevents air directed into filter interior 35 through inlet tube 14 from bypassing filter media 25 and getting into clean air plenum 44. In general, the various portions of the arrangement 4 cooperate as an air flow direction arrangement to direct air flow: into the housing, into the filter interior, through the filter media and outwardly from the housing.

Another point of potential leakage of unfiltered air into clean air plenum 44 is presented by the location whereat inlet construction 3 engages filter can 4. This region is located generally at 50; i.e., where bolts 8 secure inlet construction 3 to filter can 4. At region 50, inlet construction 3 is provided with an outwardly extending flange 52; and, can 4 is provided with an outwardly extending flange 53. Seal ring 54 is provided in extension around can 4, between flanges 52 and 53. Seal ring 54 is positioned at a location between bolts 8 and filter element 21. When bolts 8 are tightened, seal ring 54 will be compressed between flanges 52 and 53, i.e., at a location between inlet construction 3 and filter can 4, providing a seal. Thus, air leakage into plenum 44, by passage between portions of can 4 and inlet construction 3 is inhibited. Filter ring 54 may be a conventional O-ring type gasket.

Attention is now directed to FIG. 5, which is a cross-sectional view showing the "bottom half" or "opposite end" of assembly 1 from the end whereat inlet construction 3 is located. Referring to FIG. 5, reference numeral 60 generally designates an end of can wall 61. Within end 60 is positioned a cover or base 63 of can 4. Base 63 is configured in a preferred manner, to advantage.

For the particular embodiment shown, base 63 is circular, to conform to the cross-sectional configuration of can wall 61 at end 60. For the particular embodiment shown, base 63 is also radially symmetric. That is, the features of base 63 are configured radially symmetrically about central axis 33. Base 63 includes end flange 65 for engagement with end 60, for example by means of welds.

Progressing inwardly from flange 65 toward its center 66, the features of the preferred base 63 depicted are as follows: an annular circumferential sealing surface 67 is provided; a bend or corner 68; an end surface 69; a secondary seal bead or ridge 70; and, a central pan 71. In the center 66 of pan 71, drainage aperture 18 is provided.

The arrangement shown in FIGS. 1–7 is configured preferentially so that when oriented for use, pan 71 is at a lowermost or recessed location, so that water will drain to pan 71 under gravity influence. As the water drains into pan 71, it will be drained outwardly from air cleaner assembly 1 through drainage aperture 18. Particular features described herein are provided, for a preferred manner of debris collection within assembly 1 and drainage of collected moisture to aperture 18.

Still referring to FIG. 5, filter element 21 includes end cap 24 thereon. End cap 24 is of an appropriate material, and of appropriate size, so that when it is pushed into and against base 63, an outer circumferential surface 75 of the end cap 24 engages surface 67 of base 63 in a sealing manner. That is, an annular seal 76 is formed in region 77, circumferentially around end cap 24. This is facilitated by preferably providing surface 67 in a cylindrical configuration extending generally parallel to axis 33. The seal prevents unfiltered air from reaching clean air plenum 44. As a result of the circumferential seal, sealing against flow of air is not required between any other portions of filter element 21 and base 63. A secondary seal 80, described herein below, is provided, however, between end cap 24 and base 63. The secondary seal 80 is generally provided to inhibit movement of debris or water into region 81, between element 21 and base 63, rather than to necessarily prevent flow of air therebetween. Thus, while seal 76 should be in a form sufficient to withstand a pressure differential thereacross of up to about 40 inches of $H_2O$, secondary seal 80 will generally be sufficient if it can maintain at pressure differential thereacross of up to about 2 inches (and typically only up to about 2–4 inches) of $H_2O$.

Still referring to FIG. 5, end cap 24 includes a circular recess or trough 85 therein. Trough 85 is sized and configured to receive and sealingly engage bead 70. Trough 85 should be sized, relative to bead 70, such that when element 21 is pressed against base 63, bead 70 is pushed into trough 85 to form a seal therewith, capable of holding a pressure differential of up to about 2–4 inches of $H_2O$. This could be readily accomplished by forming the related region 86 of end cap 24 of an appropriately soft compressible polymeric material into which rigid bead 70 can be pressed, for engagement.

Figure 6:
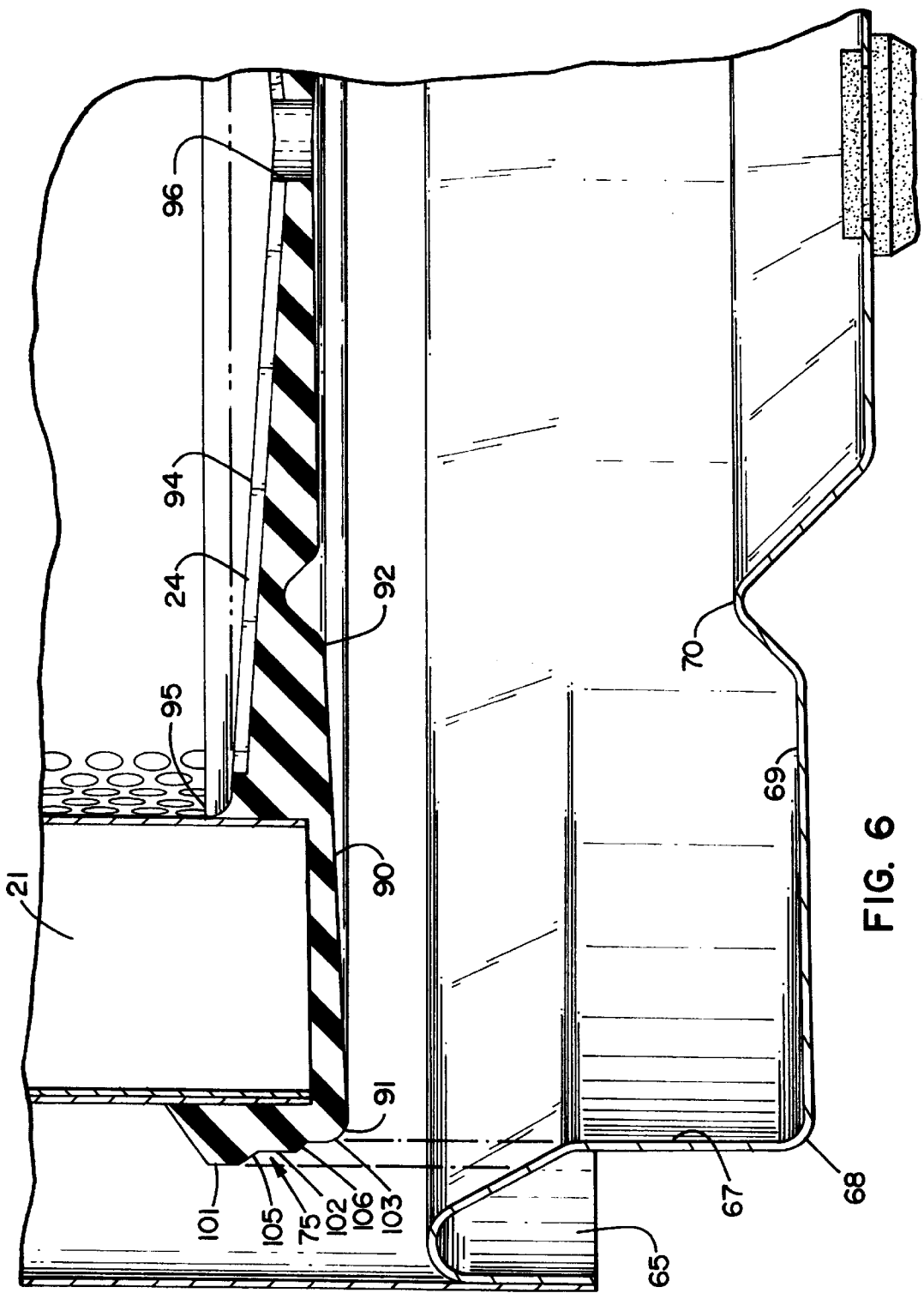
FIG. 6 is a fragmentary exploded view of a portion of the arrangement shown in FIG. 5.

Referring to FIGS. 5 and 6, it is noted that for the preferred embodiment depicted surface 90 of end cap 24 is recessed from outer edge 91 to region 92, so that a space between surface 90 and end surface 69 is provided, when filter element 21 is operatively positioned within can 4. The amount of recess can be varied, depending upon the size of the arrangement. In general, an angle of inclination from edge 91 to region 92 on the order of about 1° to 3° will be sufficient.

Advantages which result from this inclination, will be apparent from further descriptions herein below. In general, the space between surface 90 and end surface 69 ensures that there will not be interference with easy formation of the annular, radial, seal.

Still referring to FIGS. 5 and 6, internal surface 94 of end cap 24 is configured to slope downwardly, when the assembly 1 is oriented as shown in FIGS. 5 and 6, in extension from outer region 95 toward central aperture 96. Preferably, internal surface 95 is conical or funnel shaped in this region. Thus, any water which collects on internal surface 94 will tend to flow toward central aperture 96 and therethrough, into recessed pan 71. In some embodiments, recessed radial troughs extending outwardly and upwardly from central aperture 96 can be used to facilitate this flow. Such an arrangement is shown, for example, in FIG. 7 (a top plan view of element 21) wherein four evenly (radially) spaced, recessed, troughs 99 are depicted. It will be understood that each of troughs 99 generally inclines downwardly as it extends from region 95 toward central aperture 96, to facilitate collection of water within interior 35 and direction of the collected water to central aperture 96. An advantage to troughs 99 is that should a leaf or other large particulate material become positioned over central aperture 96, water can still flow into and through the aperture 96 by means of the troughs 99, since the troughs 99 can generally direct water flow underneath debris collected on top of internal surface 94.

Numerous advantages result from the preferred features described. As assembly 1 is used for a filtering operation, air will generally flow through inlet tube 14 into interior 35, carrying within it moisture and/or debris. The moisture and debris will tend to collect within interior 35, on internal surface 94 of end cap 24, since arrangement 1 will generally be configured with end cap 24 positioned beneath inlet tube 14. Water collecting on internal surface 95 will generally be directed toward central aperture 96, for drainage into recessed pan 71 and eventually drainage outwardly from assembly 1 through drainage aperture 18. Evacuation valve 19, if used, will facilitate this.

Because sealing between end cap 24 and housing 2 is positioned along annular circular sealing surface 67, i.e., at region 77, the critical sealing is not located at a surface where debris is likely to be spread or collect, as element 21 is removed from and replaced into housing 2, during typical maintenance operations.

Because surface 90 is recessed from end surface 69, in extension between edge 91 and region 92, any debris which may spread along end surface 69 during operations involving removal and insertion of filter elements into housing 2, will not likely interfere with sufficient insertion of the element 21 into can 4 for the development of a good seal at region 77. That is, some debris buildup along the bottom of base 63 is well tolerated.

Also, secondary seal 80 will inhibit the likelihood of debris or moisture moving from pan 71 into surface 69, or region 77. This will also help facilitate removal of moisture from assembly 1, since the moisture will tend to concentrate near drainage aperture 18.

In FIG. 6, the arrangement of FIG. 5 is shown exploded. From this, a preferred configuration for surface 75, relative to circular (annular) sealing surface 67 will be understood. In particular, surface 75 includes steps 101, 102 and 103, with extensions 105 and 106 therebetween. Step 103 is approximately the same diameter as circular sealing surface 67, and facilitates guidance of air cleaner element 21 into engagement with base 63, during assembly. Step 102 is preferably slightly larger in diameter than circular sealing surface 67, and step 101 is preferably slightly larger in diameter than step 102, to enhance compression of end cap material in region 77, as element 21 is inserted into base 63, during assembly. In this manner, a good seal is formed. In general, for preferred embodiments the actual amount of compression of the end cap in region or step 102 is 3 mm±1 mm on diameter (or 1.5 mm at any location). The diameter of step 102 is preferably about 1.5 mm greater than step 101, and about 3 mm greater than step 103. The amount of compression in step 102 would preferably be about 21.4% (20% ±3%).

As indicated, the arrangement described with respect to FIGS. 1–7 generally utilizes a radial seal engagement in region 77. Alternate sealing arrangements may be utilized. An example of such an arrangement is illustrated in the alternate embodiment of FIG. 8.

Figure 8:
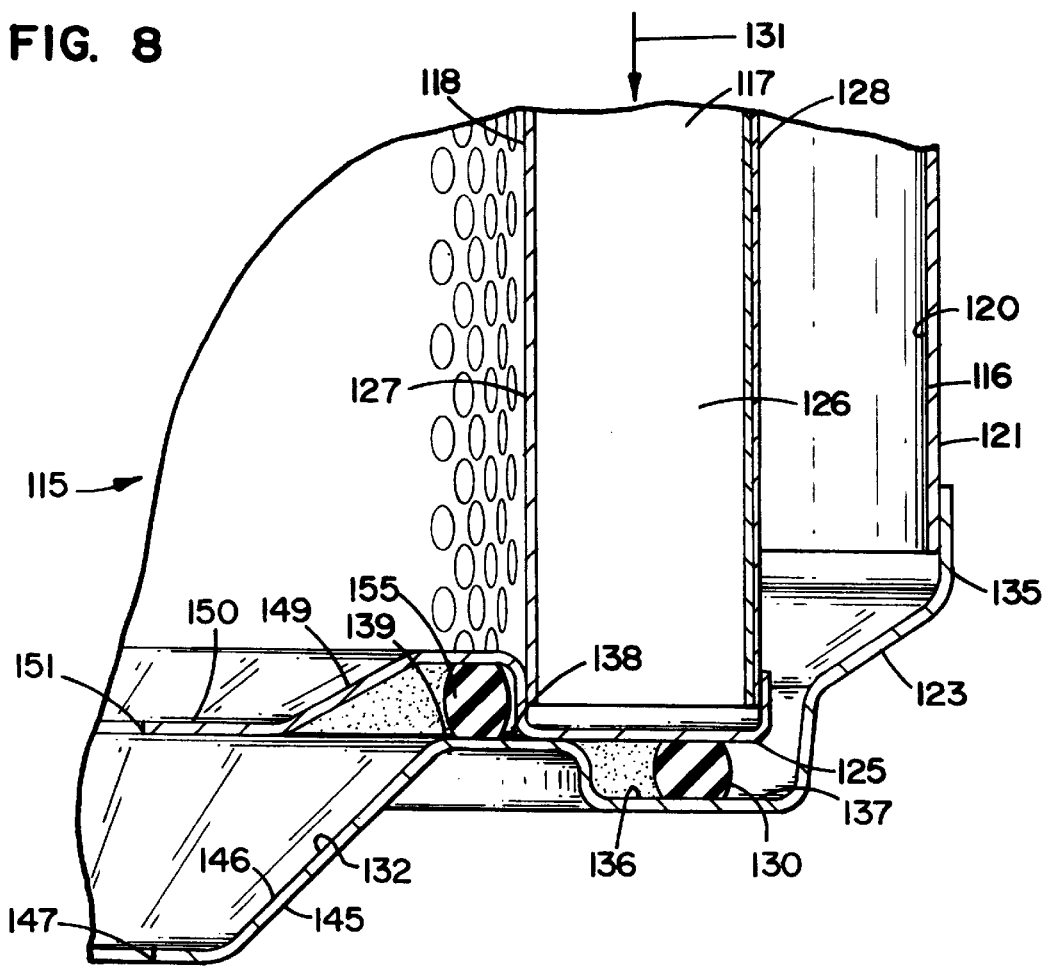
FIG. 8 is a fragmentary cross-sectional view of an alternate embodiment to that shown in FIGS. 1–7.
Figure 7:
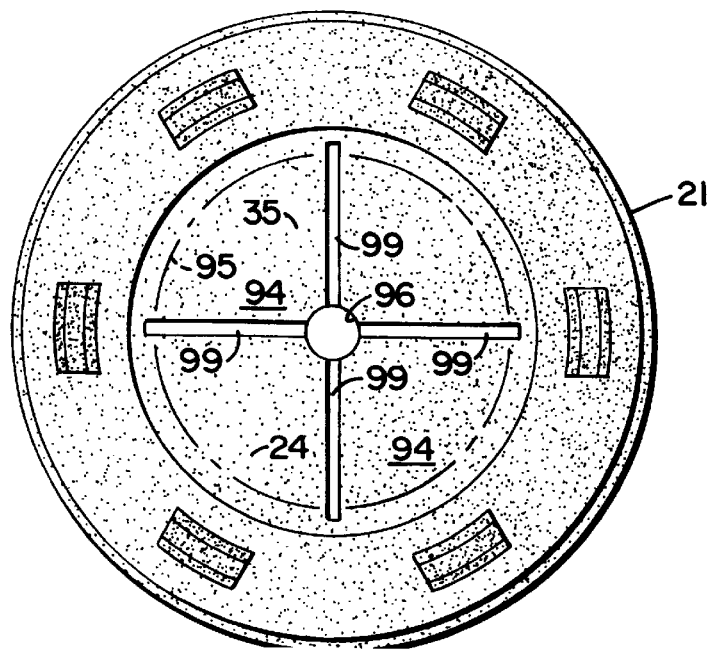
FIG. 7 is a fragmentary top plan view of a portion of the arrangement shown in FIG. 6.

In FIG. 8 an alternate application of principles according to the Ser. No. 08/742,244 disclosure is provided. FIG. 8 illustrates an engagement between an air cleaner assembly base and a filter element, to provide advantages according to the present invention, in an arrangement which utilizes an "axial seal" between the filter element and the housing, at least at this location.

In general, an axial seal is a seal which is maintained by forces directed along an axis of the filter element, as opposed to radial seal arrangements described with respect to FIGS. 1–7 which use forces directed radially around an axis. Axial seal arrangements have been widely utilized in filter elements in a variety of manners. Often a central yoke or axle is provided, along which forces are directed between the housing in the element. In other systems a bolt engagement between portions of the housing are used to compress the element against one end or both ends of the housing. The O-ring 54 in the embodiment of FIGS. 1–7, for example, provides sealing by axial compression.

FIG. 8 is a fragmentary cross-sectional view of an alternate air cleaner assembly 115. The air cleaner assembly 115 is also a reverse flow arrangement. Assembly 115 includes housing 116 and air filter element 117. An inlet arrangement, not depicted, would be utilized to direct air flow into interior 118. Air flow would then be through filter element 117 into clean air plenum 120, and outwardly through a conventional outlet, not shown, into an air intake for an engine.

In FIG. 8 the outer wall of the housing 116 or can, is generally shown at 121. The housing end or base 123 is configured to perform functions generally analogous to those for base 63, FIGS. 1–7.

Still referring to FIG. 8, filter element 117 has a sheet metal end cap, such as end cap 125. The filter element 117 includes filter media 126 potted within the end cap 125 (the opposite end cap not being shown in FIG. 8). Element 117 includes inner and outer liners 127 and 128 respectively.

Sealing between element 117 and base 123, against air flow therebetween, is provided by gasket 130. That is, an appropriate mechanism to apply axial forces in the direction of arrow 131 against element 117 should be provided, to compress gasket 130 between end cap 125 and base 123 and form a seal. This can be accomplished with bolts used to drive an end cover or inlet construction against an opposite end of element 117. Preferably appropriate sizes and configurations of the element 117, base 123 and gasket 130 are selected, so that the seal of gasket 130 will be sufficient to hold a pressure differential at least about 40 inches of $H_2O$ thereacross. In this manner, unfiltered air in region 132 is prevented from reaching clean air plenum 120, in use.

In general, the features of the preferred base 123 depicted are as follows. Base 123 is radially symmetric and includes outer flange 135, for securement to can wall 121, such as by welding. Base or recess area 136 is provided for a receipt of gasket 130 therein, during sealing. This is accommodated by recessed area 136 forming a trough 137. Region 138, of base 123, is raised above trough 137, and provides a raised surface 139 for provision of a secondary seal, as described below. Base 123 then defines pan 145, by downwardly extending or declining wall 146, towards a recessed central aperture 147.

With respect to the filter element, end cap 125 includes a downwardly slanted surface 149 toward central pan 150 having drainage aperture 151 therein.

A secondary seal between end cap 125 and surface 139 is provided by secondary seal gasket 155. This gasket 155 is intended to inhibit the migration of moisture and debris from recessed pan 145 into region 137, whereat it could interfere with seal gasket 130. Secondary gasket 155 need only provide a seal sufficient to inhibit substantial migration of moisture and debris, and does not need to be a primary air seal. Thus, gasket 155 need only be compressed sufficiently to withstand a pressure differential of up to about 2–4 inches of $H_2O$ thereacross.

Operation of assembly 115 will now be apparent. When assembled, sufficient axial pressure is applied along the direction of arrow 131, to provide an air seal end at gasket 130 and a secondary seal at gasket 155. Debris and moisture directed into interior 118 will generally collect in pan 150.

In general, moisture collecting along recessed surfaces 149 will be directed downwardly toward and through aperture 151, into pan 145 of base 123, and eventually through drainage aperture 147 and outwardly from assembly 115. It will be understood that a trough system (analogous to that described for FIGS. 1–7) may be utilized in pan 150, if desired, to inhibit the likelihood of drainage aperture 151 becoming closed or plugged by debris.

Materials Described in Ser. No. 08/742,244

According to Ser. No. 08/742,244, while a wide variety of materials may be utilized in the constructions, the principles described were particularly developed for use, to advantage, with systems constructed from certain preferred materials. In general, the constructions were designed for utilization with sheet metal housing systems, or stainless steel housing systems; i.e., arrangements wherein the housing, in particular the inlet assembly, the can and the base, are formed from sheet metal or stainless steel parts which are secured to one another as by welding. Materials useful for such fabrication include 0.075-0.025 (incorrectly stated as 0.75-0.25 in the earlier disclosures) inches thick stainless steel or sheet metal, although other thickness are useable. Plastics can also be used.

For the arrangement of FIGS. 1–7, the preferred end cap material described in Ser. No. 08/742,244 for forming the regions in the end cap that need to be compressed to form a seal is a soft polymeric material such as foamed polyurethane. Such materials include the following polyurethane, processed to an end product having an as molded density of 14–22 pounds per cubic foot (lbs/ft$^3$).

The preferred polyurethane described in Ser. No. 08/742,244 comprises a material made with I35453R resin and I3050U isocyanate. The materials should be mixed in a mix ratio of 100 parts I35453 resin to 36.2 parts I3050U isocyanate (by weight). The specific gravity of the resin is 1.04 (8.7 lbs/gallon) and for the isocyanate it is 1.20 (10 lbs/gallon). The materials are typically mixed with a high dynamic shear mixer. The component temperatures should be 70–95° F. The mold temperatures should be 115–135° F.

The resin material I35453R has the following description:
(a) Average molecular weight
1) Base polyether polyol=500–15,000
2) Diols=60–10,000
3) Triols=500–15,000
(b) Average functionality
1) total system=1.5–3.2
(c) Hydroxyl number
1) total systems=100–300
(d) Catalysts
1) amine=Air Products 0.1–3.0 PPH
2) tin=Witco 0.01–0.5 PPH
(e) Surfactants
1) total system=0.1–2.0 PPH
(f) Water
1) total system=0.03–3.0 PPH
(g) Pigments/dyes
1) total system=1–5% carbon black
(h) Blowing agent
1) 0.1–6.0% HFC 134A.
The I3050U isocyanate description is as follows:
(a) NCO content—22.4–23.4 wt %
(b) Viscosity, cps at 25° C.=600–800
(c) Density=1.21 g/cm$^3$ at 25° C.
(d) Initial boiling pt.—190° C. at 5 mm Hg
(e) Vapor pressure=0.0002 Hg at 25° C.
(f) Appearance—colorless liquid
(g) Flash point (Densky-Martins closed cup)=200° C.

The materials I35453R and I3050U are available from BASF Corporation, Wyandotte, Mich. 48192.

For the arrangement shown in FIG. 8, the filter element includes sheet metal end caps with a fluted filter paper media element potted therein. Conventional arrangements such as potted in plastisol may be used.

Dimensions of a Typical Embodiment Described in Ser. No. 08/742,244

Consider an air cleaner arrangement such as depicted in FIG. 1 used on a over the highway truck (heavy duty truck). The housing would be about 13–15 inches in diameter and about 32 inches long. The element would be about 11–13 inches in diameter and about 23–26 inches long. The I.D. of the smallest rib on the sealing portion of the end cap with the inlet tube (prior to compression) would be about 6.78–7.44 inches. The I.D. of the annular surface in the housing base whereat the radial seal with second end cap occurs would be about 11.28–12.94 (incorrectly stated as 19.94 in Ser. No. 08/742,244) inches. The O.D. of the largest step on the second end cap, for sealing with the base, would be about 11.4–13.06 inches. The bead on the base for engagement with the second end cap would be large enough to extend into the trough on the end cap about 0.35 inches. The declination angle in the second end cap from its outer rim to the recess engaging the bead would be about 1.75°. The declination angle on the inside of the second end cap would be about 4°±2°.

Description Added to Disclosure of Ser. No. 08/742,244

It is first noted that there has been developed a preference for application of the techniques described in Ser. No. 08/742,244 since the time of filing of that application. In particular, it is desirable, when molding end cap 24, to provide for a media stand-off to ensure that the media 25 is supported above a remaining portion of a bottom surface of the mold, when the molding occurs. The mold can be provided with a circular, raised, media stand-off positioned in a portion of the mold underneath the media 25, during molding, to provide for this. The end cap 24 would, in general, show an indent ring corresponding to the mold stand-off, at a location aligned with media 25, as a result of this.

Also, hereinbelow a preferred material for use with the embodiment of FIGS. 9–15, as the urethane material, is provided. Such a preferred material and processes for its use, may also be used with the embodiment of FIGS. 1–7, for both end caps.

It is also noted that the specific overall depiction of FIGS. 9, 10, 11, 12, 13, 14 and 15 included herein, were not part of the disclosure of Ser. No. 08/742,244. Description related to them, has been added.

FIGS. 9–15 concern a variation in which the "closed" end cap having the drainage aperture therein, while it comprises polymeric material into which the ends of the inner and outer supports or liners and media are potted, further comprises a composite of polymeric material and a pre-formed insert. (By "pre-formed" in this context, reference is made to the fact that the insert was formed before a remainder of the end cap was molded.) As a result of a preferred embodiment for achieving this, shown in FIGS. 9–15, the inner surface of this end cap (which comprises the drainage surface to the aperture), is physically an inner surface of the end cap insert. This too will be understood by reference to FIGS. 9–15 and the descriptions hereinbelow.

A principal difference for the embodiment of FIGS. 9–14, from the embodiment of FIGS. 1–7, concerns the referenced insert and the specifically recited composite nature of the closed end cap having the drainage aperture therein. There are, however, some further modifications in an exterior surface of the insert. These too will be described in connection with FIGS. 9–15.

Figure 9:
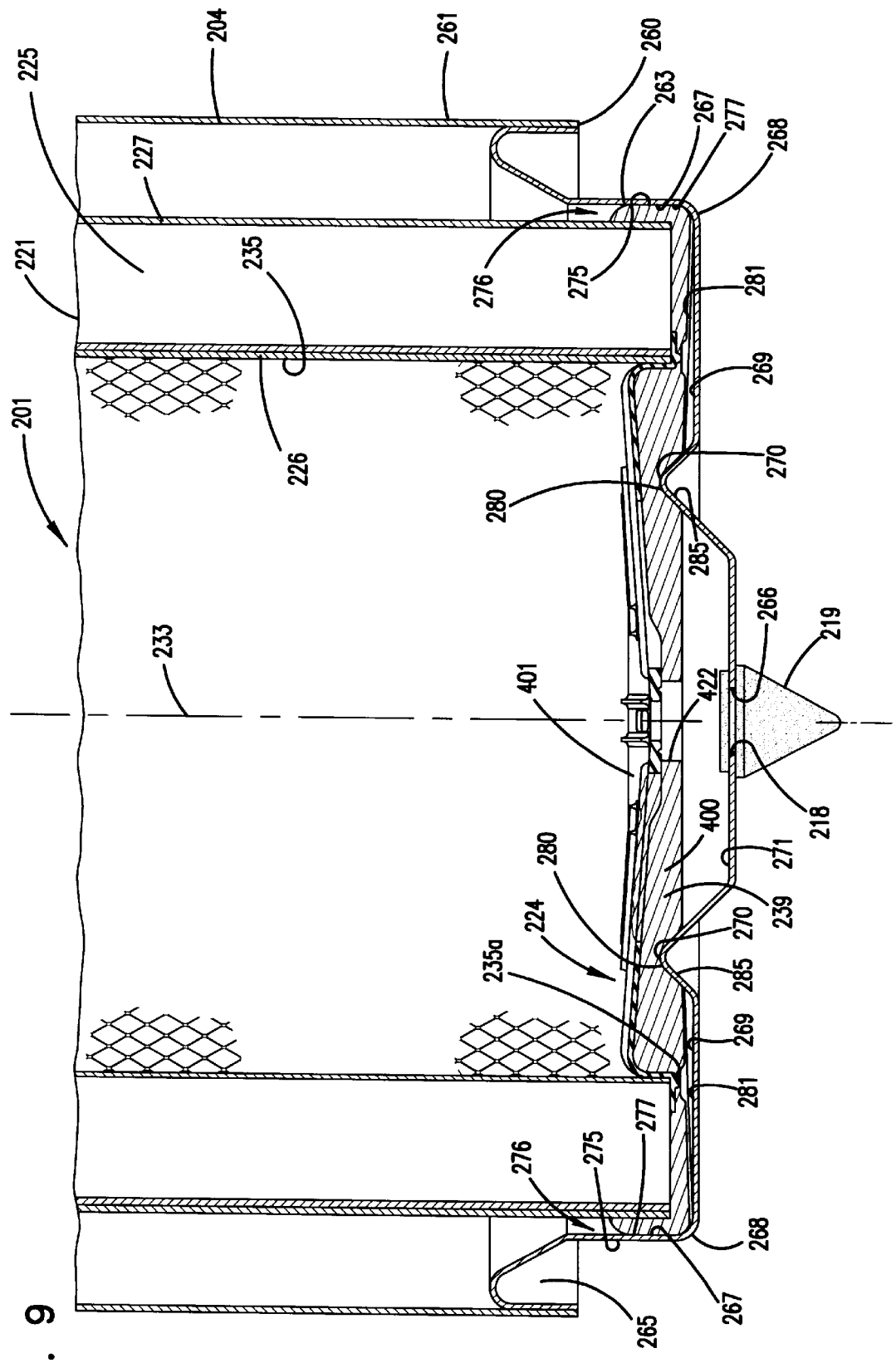
FIG. 9 is a fragmentary cross-sectional view of a second alternate embodiment of the present invention, taken from a point of view analogous to that used for FIG. 5.

Attention is first directed to FIG. 9. FIG. 9 is a fragmentary cross-sectional view of an assembly according to this alternate embodiment of the present invention. Referring to FIG. 9, assembly 201 comprises a combination of can 204 and element 221. In FIG. 9, reference numeral 260 generally designates an end of can wall 261. Within end 260 is positioned a cover or base 263 of can 204. Can 204, including base 263, is configured analogously to can 4 and base 63 of FIG. 5, and thus includes, analogously: a configuration which is preferably radially symmetric around a central axis 233; end flange 265; center 266; sealing surface 267; bend or corner 268; end surface 269; secondary seal bead or ridge 270; end recess 271; and, in center 266, a drainage aperture 218. Positioned within aperture 218, is evacuation valve 219.

Still referring to FIG. 9, filter element 221 includes end cap 224 thereon. End cap 224 comprises an appropriate material, and is of appropriate size, so that when it is pushed into and against base 263, an outer circumferential surface 275 of the end cap 224 engages surface 267 of base 263 in a sealing manner. That is, an annular seal 276 is formed in region 277, circumferentially around end cap 224. As with the embodiment of FIG. 5, this is facilitated by preferably providing surface 267 in a cylindrical configuration extending generally parallel to axis 233. As a result of the circumferential seal 276, sealing against flow of air is not required between any other portions of filter element 221 and base 263. A secondary seal 280, analogous to seal 80, FIG. 5, is provided, however, between end cap 224 and base 263. The secondary seal 280 inhibits movement of debris or water into region 281, between element 221 and base 263.

It is noted that the particular configuration of outer circumferential seal surface 275 of end cap 224, for the arrangement shown in FIG. 9, differs from the analogous surface 67 in the embodiment of FIG. 5. A preferred configuration for surface 267 (and surface 67 if applied in the embodiment of FIG. 1) is described hereinbelow in connection with the mold FIG. 13.

Still referring to FIG. 9, end cap 224 includes a circular recess or trough 285 therein. Trough 285, analogously to trough 85, FIG. 5, is sized and configured to receive and sealingly engage bead 270. Trough 285, which, in the preferred embodiment depicted has somewhat of an inverted "V" configuration (with a rounded apex) when viewed in cross-section, should be sized, relative to bead 270, such that when element 221 is pressed against base 263, bead 270 is pushed into trough 285 to form a seal therewith, capable of holding a pressure differential at least up to about 2–4 inches of $H_2O$.

Analogously to end cap 24 of the arrangement shown in FIG. 5, end cap 224 comprises a soft, polymeric material. However, unlike end cap 24 shown specifically in FIG. 5, end cap 224 is a composite. In particular, end cap 224 comprises: section 399 of compressible, polymeric material 400; and, insert 401. Advantages which result from the provision of the insert 401, as part of the end cap 224, will be apparent from further descriptions hereinbelow.

A more detailed description of the manner of construction, to provide insert 401, is also provided hereinbelow. In general, the insert 401 is secured to the "filter pack" which would typically comprise media 225 (which is pleated paper in the preferred embodiment shown), inner support 226, and outer support 227. Supports 226 and 227 could comprise, for example, conventional perforated metal or expanded metal media liners. Inner liner 226 defines inner chamber 235 (which is cylindrical in the preferred embodiment shown). During assembly, after the filter pack comprising the liners 226, 227 and media 225 is prepared, insert 401 would be positioned in one end of that filter pack, closing an end 235a of chamber 235. The assembly comprising a filter pack and insert would then be potted within the polymeric material which is then cured to form material 400, FIG. 9. In a typical operation, this potting would be achieved by positioning the filter pack and insert 401 in an appropriate mold and distributing within the mold the uncured polymeric material, which is then cured. As a result of the process, again described in more detail below, the insert 401 becomes permanently embedded within the material 400, to become secured within the filter element 221 (between material 400 and liner 226) as a part of the composite end cap 224. In the final product, region 400 covers an underside of insert 401, except in some instances for selected portions as described below.

Figure 10:
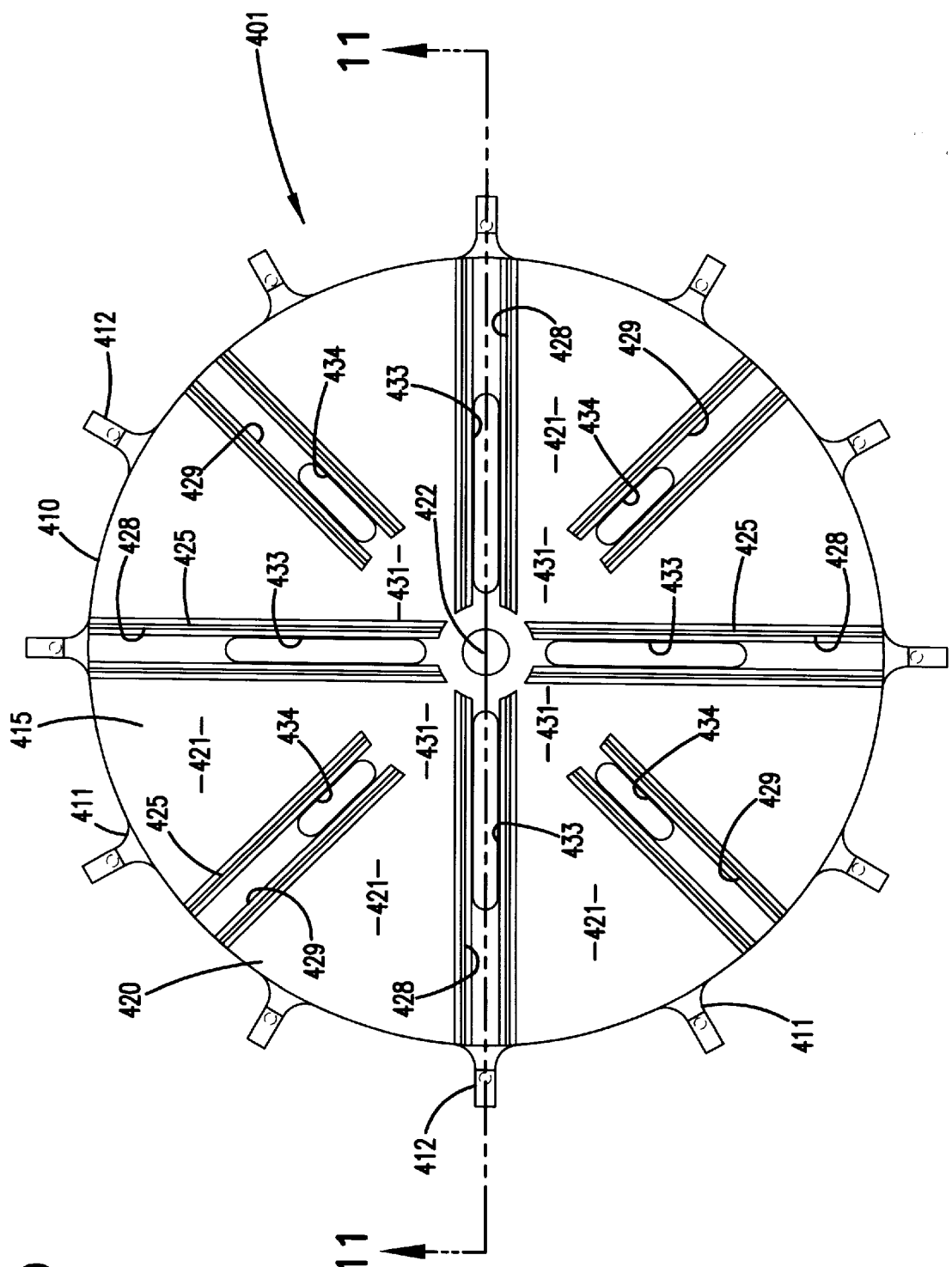
FIG. 10 is a top plan view of a component used in the alternate embodiment of FIG. 9.

Attention is now directed to FIGS. 10 and 11 in which the details of the preferred insert 401 are depicted in detail, and from which advantages which result from utilization of the insert 401 can be understood. Referring first to FIG. 10, which is a top plan view of the insert 401, the insert 401 has an outer perimeter 410 (circular in the preferred embodiment shown) with depending legs 411. The specific insert 401 depicted in FIG. 10 includes twelve evenly radially (i.e., separated radially by 30°) spaced legs 411, each of which terminates in a foot 412. Of course, alternate numbers and specific configurations of legs 411 and feet 412 may be used.

In general, insert 401 includes an upper surface 415, FIG. 10, and an opposite, bottom surface or lower surface 416, FIG. 11.

In general, upper surface 415 of insert 401 will, when element 221 is assembled, generally comprise the inner surface of composite end cap 224. Thus, surface 415 will include thereon the inner drainage surface for directing fluid to central aperture 296 in element 224.

Referring to FIG. 11, insert 401 includes, on surface 415, an apex or upper ridge 420. Ridge 420 is preferably a perimeter ridge, and is circular. Preferably surface 415 includes funnel section 421 therein, tapering downwardly from apex or ridge 420 to central drainage aperture 422. A downward taper of 2 to 6°, typically 4°, will be preferred. Aperture 422 forms drainage aperture 296, FIG. 9, in element 221. As with aperture 96, FIG. 5, aperture 422 is substantially smaller in internal dimension, i.e., diameter if round, than an internal dimension (diameter) of internal volume 235. Preferably, as with aperture 296, aperture 422 is circular, having a diameter within a range of about 0.12–1 inch, typically about 0.47 inches, whereas an internal diameter of inner liner 226 is typically 6–8.5 inches, typically, 6.02, 7.78, or 8.43 inches.

Referring again to FIG. 10, insert 401 includes standing ribs or ridges 425. The ridges 425 are directed generally from outer perimeter 410 toward aperture 422. No ridge 425, however, extends completely to aperture 422, in the preferred embodiment shown.

Also in the preferred embodiment shown, ridges 425 form pairs comprising two sets of channels or troughs: troughs 428, of which there are four depicted in the preferred embodiment; and, troughs 429, of which there are also four in the preferred embodiment shown. For the preferred embodiment shown, troughs 428 are identical to one another, and are separated radially by 90°. Troughs 429 are also identical to one another and are separated radially by 90°. Each one of troughs 429 is evenly spaced between two adjacent ones of troughs 428. Each of troughs 429 and 428 comprises a pair of ridges 425.

Troughs 428 differ from troughs 429 in that troughs 428 are longer; that is, troughs 428 extend a greater percentage of the distance toward aperture 422 from perimeter ridge 420. Troughs 429 are shorter (in elongated extension), primarily in order to leave open spaces 431 for liquid flow on surface 415 toward aperture 422.

Between the ridges 425 defining any given trough, 428, 429, an aperture hole through insert 401 is provided. Thus, there are two sets of apertures: apertures 433 in troughs 428; and, apertures 434 in troughs 429. Apertures 433 and 434 are generally oval-shaped, and act as free rise apertures to allow for free rise of polymeric material 400 therethrough, during the molding process. This helps secure the insert 401 as part of the composite end cap 224. It also facilitates a controlled molding process, as described below. The ridges 425 help contain the rising polymeric material 400, during the molding process, in part to maintain substantial portions of surface 415 open, for free fluid flow thereacross.

Note that as a result of the ridges 425 being raised above surface 415, improvement in liquid flow across surface 415 is provided. This is in part because leaf material, paper material, etc., which settles into element 221 may, at least in some instances, be supported above surface 415 by the ridges 425.

Attention is now directed to FIG. 11. From FIG. 11, it can be understood that depending legs 411 generally bow outwardly from ridge 420, depending from surface 416. Preferably, each leg 411 is about 0.625 inches long in extension between ridge 420 to the bottom tip of beads 440, FIG. 11.

Preferably an outer radius defined by the perimeter of the legs at regions 430, is slightly larger than the inner dimension (diameter) of liner 235; and, legs 411 are sufficiently thin to flex inwardly somewhat, when pressed into an end of inner liner 235, during assembly. This "spring" effect can be used to temporarily secure insert 401 to liner 235 in the filter pack, during the molding operation, as described below. Preferably, the outer radius of the legs at regions 430 is about 0.25 inches.

Each leg 411 extends slightly outwardly from the vertical. This is to help facilitate manufacturing of the insert 401, so that it may be more easily pulled from its mold. Preferably, each leg 411 extends at an angle of about 5° from vertical.

Each leg 411 includes a tapered rib 413 extending therefrom. Each rib 413 extends from just above an upper surface 441 of each foot 412 to just below the radiussed surface 430. Ribs 413 help to temporarily secure insert 401 to liner 235 in the filter pack, during the molding operation, as described below. Preferably, each rib 413 is about 60 thousandths of inch thick, and extends a length of about 0.3 inches. Each rib 413 extends about 1° from vertical.

Still referring to FIG. 11, each foot 412 includes a bottom bead 440 thereon. The bottom bead 440 operates as a mold stand-off, during molding. In particular, bottom beads 440 will support a reminder of insert 401 above a lower surface of a mold, during a molding operation, to help ensure that a remainder of insert 401 will be embedded within the resin, during the molding operation. After molding, beads 440 will either be slightly exposed in the molded end cap, or they will be covered by a thin layer of molded material, depending upon the molding operation. Either condition is acceptable. Preferably, each bead 440 extends at a radius of about 0.06 inches.

Each foot also includes an upper surface 441. The upper surface is preferably at least 0.375 inches long, and, during assembly, will extend beyond the filter pack inner liner 235 to positions underneath the filter media 225. As a result of being positioned underneath the filter media 225 during assembly with a filter pack, upper surfaces 441 of the feet 412 will operate as media stand-offs, during molding. This will prevent the media 225 from dropping all the way to the bottom of the mold cavity.

Still referring to FIG. 11, attention is directed to a portion of surface 416 which circumscribes aperture 422. That portion or region is indicated generally at reference numeral 450. Within this region is located a circular trench 451. (Circular when viewed in bottom plan view.) The circular trench 451 preferably has a semi-circular cross-section as shown in FIG. 11, although alternative configurations can be used. During the molding operation, trench 451 will be aligned with, and receive, a bead in the mold. This will inhibit, during molding, flow of resin along the direction indicated generally by arrows 452, past surface 450 and into aperture 422. The result will be an inhibition of polymeric flash at, or in, aperture 422.

As a result, it is anticipated that after a molding operation, certain portions of surface 450, indicated generally at 455 between trough 451 and aperture 422, will generally be exposed, except perhaps for some small amount of flash from the molding operation. The exposed surface 455 is viewable in FIG. 14, a bottom plan view of element 221.

Advantages to a composite end cap 224 including an insert such as that shown in FIGS. 10 and 11, result from at least two related concerns. First, it is anticipated that insert 401 will typically be manufactured from a material that can be molded, for example a molded, rigid, polystyrene or similar material. As a result of such a molding, specific configurations can be readily provided to surface 415 to achieve advantageous fluid flow effects and similar effects without relying upon control of conditions used to mold material 399, 400. Thus, the surface features of surface 415 are not achieved during the same operation in which the soft, polymeric material for the remainder of end cap 224, i.e., material 400, is formed.

In addition, the molding process to provide for polymeric material 400 is facilitated. This is because a "closed mold" process is not required. Rather, free rise of the polymeric material 399 is accommodated because insert 401, including apertures 433 and ridges 425, will control and direct rise. The free rise will not effect the downward slant in regions 421, to achieve a desirable drainage effect in insert 401, since the inner surface 415 of the end cap 224 is pre-formed.

In general, when the end cap 424 comprises a composite of an insert 401 and polymeric material 400 as described herein, the polymeric material may comprise the preferred polyurethane described in application Ser. No. 08/742,244, and previously herein, molded end or similar conditions.

However, preferably the urethane comprises a material made with Elastofoam I36070R resin and Elastofoam I3050U isocyanate as described below. The material should be mixed as described above, except with I36070R, replacing the I35453R resin. For this material, the mold temperature should preferably be about 105°–150° F.

The resin material I36070R has the following:
(a) Average molecular weight
1) Base polyether polyol=500–15,000
2) Diols=60–10,000
3) Triols=500–15,000
(b) Average functionality
1) total system=1.5–3.2

(c) Hydroxyl number
  1) total systems=100–300
(d) Catalysts
  1) amine=Air Products 0.1–3.0 PPH
(e) Surfactants
  1) total system=0.1–2.0 PPH
(f) Water
  1) total system=0.03–3.0 PPH
(g) Pigments/dyes
  1) total system=1–5% carbon black The Elastofoam I3050U isocyanate description is as follows:
  (a) NCO content—22.4–23.4 wt. %
  (b) Viscosity, cps at 25° C.=600–800
  (c) Density=1.21 g/cm$^3$ at 25° C.
  (d) Initial boiling pt.—190° C. at 5 mm Hg
  (e) Vapor pressure=0.0002 Hg at 25° C.
  (f) Appearance—colorless liquid
  (g) Flash point (Densky-Martins closed cup)=200° C.

The materials Elastofoam I36070R and Elastofoam I3050U are available from BASF Corporation, Wyandotte, Mich. 48192.

Preferably the insert comprises a rigid material, such as molded polystyrene. Of course, a variety of specific configurations and alternatives to the arrangement shown in FIGS. 10 and 11 can be used. However, preferred configurations and dimensions are provided herein.

With respect to the liner material, no particular preference is made. In general, it is foreseen that the liner will comprise either perforated metal or expanded metal, for example G60 galvanized steel, having a thickness of about 0.03 inches. Such liners are commonly used in other types of large filter elements for trucks, for example.

As to the filter material, with respect to the principles of the present invention, no particular preference exists. The principles of the present invention can be applied with any of a wide variety of materials. For example, pleated paper or cellulose materials, such as conventionally used in truck filters, may be used. Synthetic materials, or cellulose materials, having synthetic (polymeric or glass) fibers applied thereto, may also be used. Expanded polytetrafluoroethylene layers, applied on a surface, or in composites, may be used. In addition, nonwoven fibrous constructions, or composites of nonwoven fibrous media and pleated media, may also be used. Indeed, arrangements not existing and yet to be developed can be accommodated, by composite end caps made according to the processes described herein. This will be apparent, from a more detailed description of the method of assembly.

Figure 12:
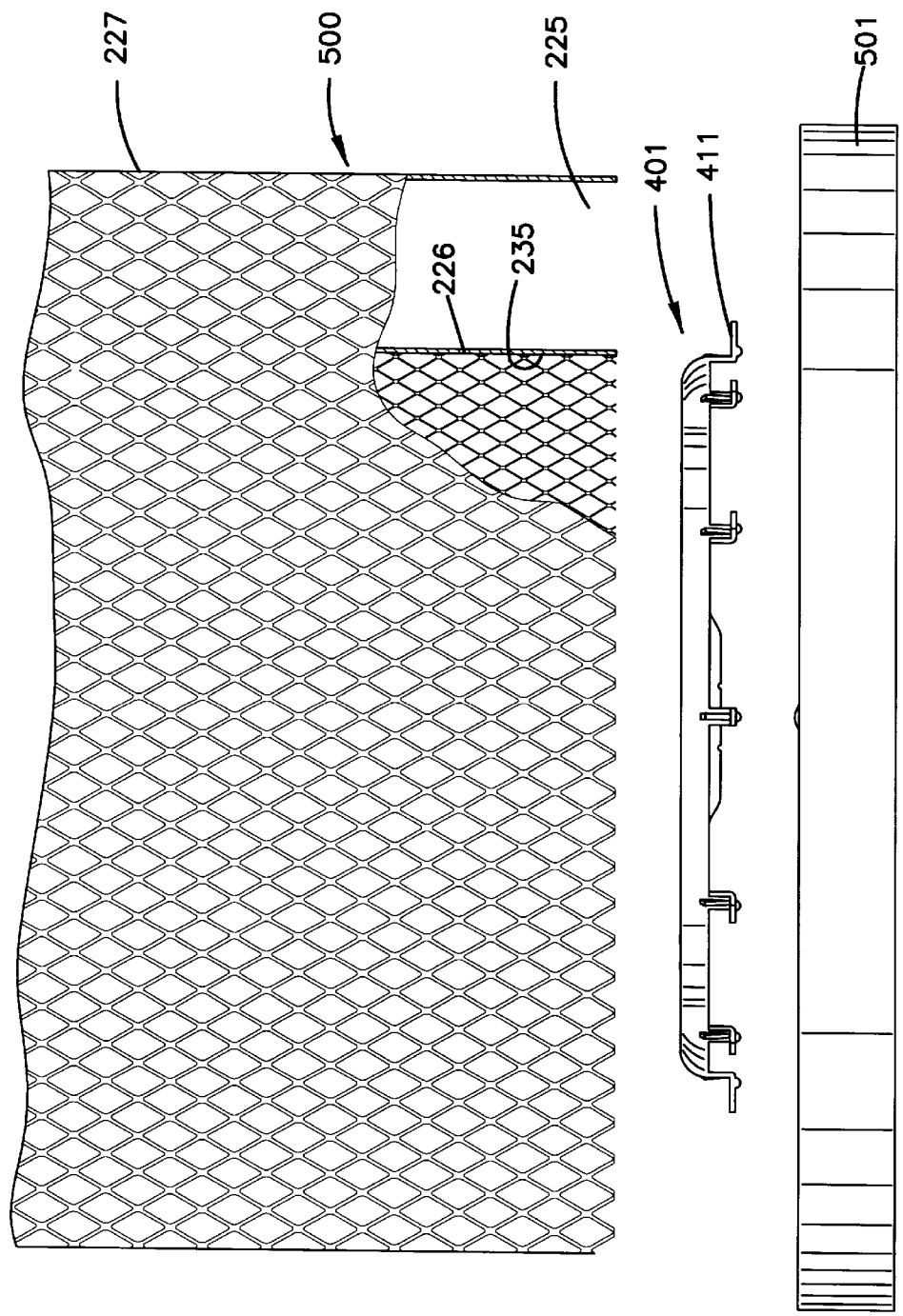
FIG. 12 is a schematic representation of a method of assembling the embodiment of FIG. 9.

In FIG. 12, a schematic representation of a preferred process for manufacturing a filter element according to the composite of FIGS. 9, 10 and 11 is provided.

Referring to FIG. 12, a filter pack is indicated generally at 500. The filter pack comprises outer liner 227, media 225, and inner liner 226. The filter pack 500 is shown aligned to receive insert 401 therein, with feet 411 positioned under media 225, and with a remainder of insert 401 positioned within inner chamber 235. The combination of filter pack 500 and insert 401 would then be positioned within mold 501. The appropriate resin mix would be positioned in the mold as well, and cured. Again, free rise conditions for curing are allowable, due in part to the design of insert 401.

Figure 13:
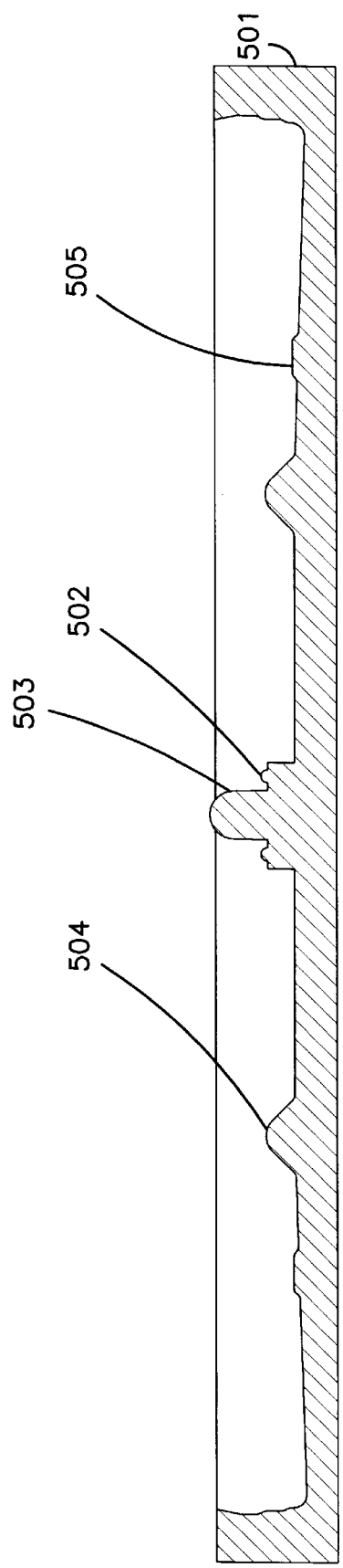
FIG. 13 is a fragmentary schematic representation of a cross-section of a mold configuration usable to generate the assembly of FIG. 9.
Figure 14:
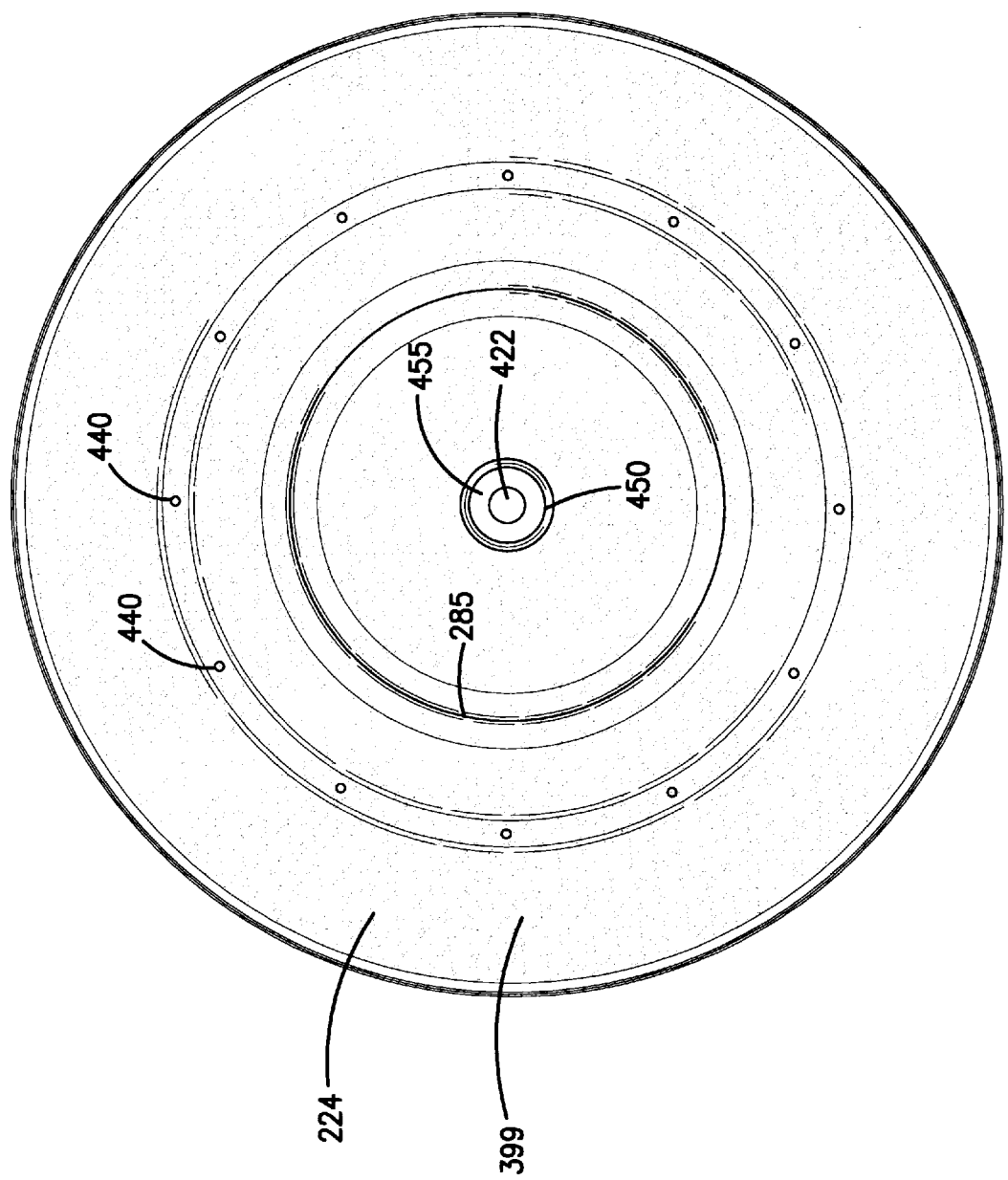
FIG. 14 is a bottom plan view of a filter element including the component of FIGS. 10 and 11 therein.
Figure 15:
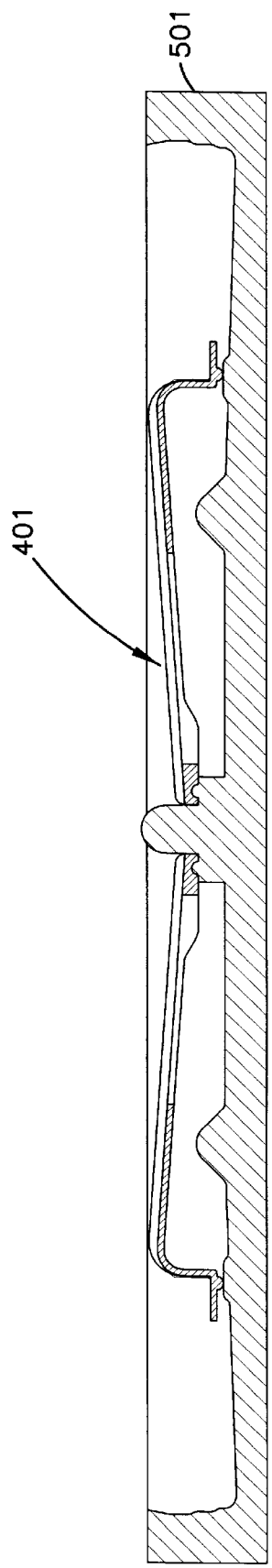
FIG. 15 is a schematic cross-sectional view depicting the component of FIG. 10 positioned in the mold of FIG. 13.

Attention is directed to FIG. 13, which indicates a schematic cross-section of a usable mold 501. Note the mold includes bead 502 for engagement with trough 451 in insert 401, FIG. 11, discussed above. Center post 503 fits through aperture 422 in insert 401, and ensures a proper positioning as well as inhibition of flash within the aperture 422. Note the positioning of bead 504, which will generate trough 285, FIG. 9. Also note the positioning of stand-off 505, which is formed as a ring in mold 501. Stand-off 505 will receive beads 440 positioned thereon, during molding. This is illustrated in FIG. 15, schematically, in which insert 401 is shown positioned within mold 501.

Some Preferred Dimensions for Arrangements According to FIGS. 9–15

Consider an air cleaner arrangement such as depicted in FIG. 1 used on a over the highway truck (heavy duty truck). The housing would be about 11–15 inches in diameter and about 32 inches long. The element would be about 9–13 inches in diameter and about 22–26 inches long. The I.D. of the smallest rib on the sealing portion of the end cap with the inlet tube (prior to compression) would be about 5.15 inches. The I.D. of the annular surface in the housing base whereat the radial seal with second end cap occurs would be about 9.52 inches. The O.D. of the largest step on the second end cap, for sealing with the base, would be about 9.64 inches. The bead on the base for engagement with the second end cap would be large enough to extend into the trough on the end cap about 0.35 inches. The declination angle in the second end cap from its outer rim to the recess engaging the bead would be about 1.75°. The declination angle on the inside of the second end cap would be about 4°±2°.

The standing ribs or ridges 425 on the insert would have a height of about 0.077 inches, and a thickness at a distal end (free end) of about 0.042 inches. Each of the ridges 425 between the base proximate to the regions 421 and the free end would be curved on a radius of about 0.062 inches. The distance between a pair of free ends of two of the ridges would be about 0.4 inches. Apertures 433 and 434 would have radii at each respective end of about 0.125 inches.

Circular trench 451 would have a semi-circular cross-section. The radius of the cross-section would be about 0.031 inches. The diameter of circular trench 451 would be about 0.736 inches.

The diameter for the insert extending from the outermost end tip of one of the feet to the outermost end tip of a diametrically opposite foot would be about 9.265 inches. The diameter of the insert extending from the outermost part of one of the legs (not including the foot) to the outermost part of a diametrically opposite leg (not including the foot) would be about 8.515 inches. The inner radius of each leg 411 as it bends from a top surface of the insert down toward its foot would be about 0.187 inches. The outer radius of each leg 411 as it bends from a top surface of the insert down toward its foot would be about 0.25 inches. The radius of each leg 411 as it bends from its substantially vertically extension to its foot would be about 0.03 inches. The radius of each bead 440 would be about 0.06 inches. The angle of declination at ramp section 453 would be about 30° from horizontal, and on a radius of about 0.125 inches.

Each rib 413 on legs 411 would be about 60 thousandths of inch thick, and extend a length of about 0.3 inches. Each rib 413 would extend about 1° from vertical. Each leg 411 would extend at an angle of about 5° from vertical, and be about 0.625 inches long in extension between ridge 420 to the bottom tip of beads 440. The upper surface of each foot would be about 0.375 inches long.

What is claimed is:

1. An air filter element comprising:
   (a) first and second, opposite, end caps;
   (b) filter media;
   (c) an inner liner defining an open filter interior;

(d) said first end cap having an air inlet opening therein;

(e) said second end cap having:
 (i) a central drainage aperture extending therethrough; and,
 (ii) an interior surface constructed and arranged to direct moisture on said second end cap interior surface to said central drainage aperture.

2. An air filter element according to claim 1 wherein:
(a) said second end cap comprises a composite including:
 (i) an inner insert having a first, inner, surface defining said second cap interior surface and an opposite, second, outer, surface; said inner insert having a central aperture extending therethrough; and,
 (ii) a compressible polymeric material covering at least a portion of said outer surface of said insert; said inner liner being embedded in said compressible polymeric material; said polymeric material having a central aperture therein aligned with said aperture in said inner insert, to form said central drainage aperture.

3. A filter element according to claim 2 wherein:
(a) said compressible polymeric material comprises a material having an as molded density within the range of 14–22 pounds per cubic foot.

4. A filter element according to claim 3 wherein:
(a) said compressible polymeric material comprises polyurethane foam.

5. A filter element according to claim 2 wherein:
(a) said inner insert includes a circular trough in said outer surface positioned to extend around said insert central aperture.

6. A filter element according to claim 5 wherein:
(a) said insert trough is semi-circular in cross-section.

7. A filter element according to claim 2 wherein:
(a) said inner insert includes a plurality of free rise apertures therein; and,
(b) a portion of said compressible polymeric material projects through said free rise apertures.

8. A filter element according to claim 7 wherein:
(a) each of said free rise apertures is positioned between an associated pair of ridges extending outwardly from said insert first surface.

9. A filter element according to claim 8 wherein:
(a) each pair of ridges comprises first and second, spaced, walls extending along a direction from an outer perimeter of said inner insert toward said central drainage aperture.

10. A filter element according to claim 7 wherein:
(a) said inner insert includes a plurality of pairs of wall projections comprising a first set of pairs and a second set of pairs;
 (i) each pair of said second set of pairs being shorter, in longitudinal extension toward said central drainage aperture, than each pair of said first set of pairs.

11. A filter element according to claim 10 wherein:
(a) each pair of said first set of pairs is spaced from each adjacent pair of said first set by a member of said second set of pairs; and,
(b) each pair of said second set of pairs is spaced from each adjacent pair of said second set by a member of said first set of pairs.

12. A filter element according to claim 11 wherein:
(a) said first set of pairs consists of four pairs of walls;
(b) said second set of pairs consists of four pairs of walls; and,
(c) each pair of walls is evenly, radially, spaced on said inner insert first surface and around said central drainage aperture.

13. A filter element according to claim 12 wherein:
(a) said inner insert has an outer periphery with a plurality of spaced legs extending outwardly therefrom:
 (i) said spaced legs projecting axially outwardly from said inner insert in a direction from said inner insert second side.

14. A filter element according to claim 13 wherein:
(a) each one of said spaced legs has a radially directed foot thereon; each radially directed foot extending away from an associated leg by a distance of at least 0.375 inches.

* * * * *